United States Patent Office 3,794,625
Patented Feb. 26, 1974

3,794,625
TRANSPARENT POLYAMIDES FROM CAPROLACTAM AND A MIXTURE OF A METHYLDIAMINO CYCLOHEXANE AND A DIBASIC ORGANIC ACID
Raymond P. Anderson, Overland Park, and Robert W. Hill, Leawood, Kans., assignors to Custom Resins, Inc., Henderson, Ky.
No Drawing. Filed Oct. 26, 1971, Ser. No. 192,635
Int. Cl. C08g 20/12
U.S. Cl. 260—78 L
13 Claims

ABSTRACT OF THE DISCLOSURE

High molecular weight linear polyamides having the property of being transparent in sections of more than 1″ thickness are prepared by polymerization of a monomer mixture consisting of 60 to 80 weight percent of caprolactam and, correspondingly, 40 to 20 weight percent of an equimolar mixture of a diamine and a dibasic organic acid in which the diamine is a methyldiaminocyclohexane and the dibasic organic acid consists of one or more aromatic dicarboxylic acid or an alpha, omega-aliphatic dicarboxylic acid. Typically, the transparent linear polyamides are prepared from a monomer mixture consisting of 67 weight percent of caprolactam and 33 weight percent of an equimolar mixture of azelaic acid and 1-methyl-2,4-diaminocyclohexane.

BACKGROUND OF THE INVENTION

Multitudes of high molecular weight linear polyamides are known in the art. Typical of such high molecular weight linear polyamides are nylon-6, prepared by the polymerization of caprolactam, and nylon-6,6 prepared by the polymerization of an equimolar mixture of adipic acid and hexamethylenediamine. One limitation on the utility of such linear polyamides is that they are opaque when molded in sections of the order of 1/16″ thick and such opaqueness limits their use for certain industrial purposes such as the manufacture of glazing, lighting fixtures, and the like.

SUMMARY OF THE INVENTION

A new class of high molecular weight linear polyamides has been discovered, which has substantially all of the desirable physical characteristics of nylon-6, and which has the additional characteristics of being transparent in thick molded sections such as compression molded sections 1″ thick. Such polyamides are prepared by the polymerization of a monomer mixture consisting essentially of 60 to 80 weight percent of caprolactam and, correspondingly, 40 to 20 weight percent of a substantially equimolar mixture of a dibasic organic acid and a diamine in which the diamine component is a methyldiaminocyclohexane. The dibasic organic acid is an alpha, omega-aliphatic dicarboxylic acid or an aromatic dicarboxylic acid.

DETAILED DESCRIPTION OF THE INVENTION

The diamine included in the monomer mixtures employed to prepare the polyamides of this invention consists of at least one of the isomers of methyldiaminocyclohexane. As will be appreciated by those skilled in the art, the methyldiaminocyclohexane can exist in six geometric isomer forms, viz., 1-methyl-2,3-diaminocyclohexane, 1-methyl-2,4-diaminocyclohexane, 1 - methyl-2,5-diaminocyclohexane, 1-methyl - 2,6 - diaminocyclohexane, 1-methyl-3,4-diaminocyclohexane, and 1 - methyl-3,5-diaminocyclohexane. Each geometric isomer can exist in three or more stereoisometric forms.

The methyldiaminocyclohexanes employed in the practice of the present invention are conveniently prepared by a three-step process which consists of (1) the dinitration of toluene, (2) the catalytic hydrogenation of the dinitrotoluenes to the corresponding diamines, and (3) hydrogenation of the diaminotoluenes to hydrogenate the aromatic rings to the cyclohexane rings. Any of the isomeric methyldiaminocyclohexanes or mixtures of them can be employed in the present invention and for this reason no separation or purification of any products in the reaction sequence described above is required.

The dinitration of toluene and the reduction of such dinitrotoluenes to the corresponding diamines are well known in the art. The diaminotoluenes can be reduced to the desired methyldiaminocyclohexanes by hydrogenation methods employing e.g. ruthenium catalysts. Typically, the diaminotoluene is dissolved in isopropanol and the solution is saturated with ammonia. Employing 5% ruthenium on alumina as the catalyst, a temperature of 140° C., and a hydrogen pressure of 3,000 p.s.i., a reaction period of 12 hours is sufficient to reduce the aromatic ring to the cyclohexane ring. The conversion of the diaminotoluene is substantially quantitative, but some small loss of the desired methyldiaminocyclohexane is observed, probably through hydrogenolysis.

Of the previously hereinabove set forth geometric isomers, the most common, and therefore, preferred isomers are the 1-methyl-2,4-diaminocyclohexane and the 1-methyl-2,6-diaminocyclohexane. These two isomers are the preferred isomers as their occurrence is greatest upon the dinitration of toluene by the above described method.

The organic dibasic acids included in the monomer mixtures employed to prepare the polyamides of the invention may be either alpha, omega-aliphatic dibasic acids or preferably an aromatic dibasic acid. The preferred aliphatic dibasic acids for use in the present invention are those containing from 5 to 12 carbon atoms in their structure, such as adipic acid, suberic acid and dodecanoic acid. Aromatic dibasic acids which can be employed in the present invention include terephthalic acid, isophthalic acid and ethylidenedibenzoic acid. The above-described acids are known compounds and many of them are available from commercial sources. Polyamides containing optimum transparency are obtained through the use of terephthalic or isophthalic acid.

To obtain polyamides having good transparency, the mixture of the diamine and the dibasic acid should be included in the monomer mixture in an amount constituting about 20 to 40 weight percent of the monomer mixture, with preferred results being obtained when the diamine-dibasic acid mixture constitutes about 25 to 35 weight percent of the monomer mixture. Optimum transparency is obtained when the diamine-dibasic acid mixture constitutes at least 30 weight percent of the monomer mixture. The balance of the monomer mixture to total 100 weight percent should be caprolactam. The percentage of the diamine-dibasic acid mixture required to obtain transparent polymers will depend somewhat upon the particular dibasic acid employed. Lower percentages of the diamine-dibasic acid mixture are required with aromatic dibasic acids.

The physical properties of the novel polyamides of this invention are generally similar to those of known caprolactam copolymers, except for their substantially greater transparency in thick mold section. The melting points of this novel polyamides are usually in the range of about 135–185° C. The solubility characteristics of the polyamides of the invention are generally comparable to the solubility characteristics of nylon-6, although the polyamides of the invention are somewhat more soluble than nylon-6 in certain organic solvents. The novel polyamides can be prepared at molecular weights such that they have relative viscosities of the order of 2.0 to 2.6, as measured as 1% solutions in 90% formic acid at 25° C. The novel polyamides can be prepared so as to have melt indices in the range of 5 to 70, as measured at 235° C. with a 2160 g. loading. Tensile properties of the novel polyamides of the invention are generally comparable to those of nylon-6. Typically, a copolymer prepared from a monomer mixture containing 67 weight percent caprolactam and 33 weight percent of an equimolar mixture of terephthalic acid and 1-methyl-2,4-diaminocyclohexane will have a tensile at yield of ca. 9,000 p.s.i., a tensile at break of ca. 7,500 p.s.i. and an enlongation of ca. 85%.

The novel polyamides are conveniently prepared by forming a salt between the diamine and dibasic acid and then mixing the preformed salt with the indicated quantity of caprolactam. The monomer mixture should then be placed in an oxygen-free reaction vessel and an inert gas, such as argon, should be continuous fed through the reaction zone during the polymerization to exclude oxygen and to remove water formed during the polymerization. The polymerizations are carried out over an extended period of time, utilizing time and temperature periods corresponding to those conventionally employed to prepared nylon-6. Typically, the polymerization will be initiated at a temperature of the order of 265° C. A polymerization period of the order of 12 to 24 hours is ordinarily required to complete the polymerization.

The caprolactam/diamine-dibasic acid monomer mixture can be polymerized without the use of polymerization initiators. If desired, however, small quantities of water of the order of 1-2 weight percent can be included in the monomer mixture to serve as a polymerization initiator. Certain organic and inorganic acids, such as acetic acid, phosphoric acid and the like, also can be employed as polymerization initiators at levels comparable to those conventionally employed in the homopolymerization of caprolactam. Since the diamine-diacid salt is not soluble in caprolactam, sufficient water may be added to the monomer mixture to provide a homogeneous solution for ease of handling. The water is rapidly evaporated on heating to polymerization temperatures.

The following examples are set forth to illustrate more clearly the principle and practice of this invention to those skilled in the art.

EXAMPLE I

Part A

A solution of 1 - methyl - 2,6-diaminocyclohexane (B.P.=68° C.@ 1 mm. Hg) in dimethylformamide was prepared by adding 1.41 g. (0.011 mol) of 1-methyl-2,6-diaminocyclohexane to 25 ml. of dimethylformamide at room temperature. In a like manner, a solution of terephthalic acid in dimethylformamide was prepared by adding 1.66 g. (0.010 mol) of terephthalic acid to 75 ml. of dimethylformamide. The two solutions were poured together in a reaction vessel where they were stirred vigorously. A copious precipitate formed nearly immediately, the precipitate being the salt formed between the amine and the acid.

The above mixture was allowed to stand for 16 hours to insure completion of salt formation. The salt was separated by filtration, washed with benzene and refiltered. The salt was twice more washed and filtered in this manner, the final filtrate containing essentially no dimethylformamide. The salt was dried for 16 hours in a vacuum oven at 60° C. An essentially quantitative yield of salt was obtained.

Part B

A monomer mixture was prepared from 0.87 g. (29 wt. percent) of the salt prepared in Part A, 2.13 g. of a purified polymerization grade caprolactam and 1.0 ml. of water. The monomer mixture was placed in a glass tube fitted with a gas inlet and a gas outlet through which argon was circulated. The polymerization vessel was placed in a heating bath and the temperature was raised to 265° C. over a period of 1.5 hours and then held at 265° C. for 19 hours. On cooling, a completely transparent block of solid polymer was obtained. The polymer, after being extracted in a Soxhlet apparatus with water and vacuum dried at 100° C., exhibited a melting range at 146–161° C.

EXAMPLES II AND III

Example I was repeated twice except that the 1-methyl-2,6-diaminocyclohexane was replaced with 1-methyl-2,4-diaminocyclohexane and 1 - methyl - 2,5 - diaminocyclohexane. Comparable results were obtained. The melting range of the extracted and dried polymer obtained in Examples II and III was respectively, 145–157° C. and 135–167° C.

Comparable results also were obtained when Examples I–III were repeated, but raising the diaminediacid component to 33 weight percent of the monomer mixture.

EXAMPLES IV–VII

Four additional polyamides were prepared following the procedures set forth in Example I, but employing azelaic acid as the dibasic acid in all cases and employing, respectively, 1-methyl-2,4-diaminocyclohexane, 1-methyl-2,5-diaminocyclohexane and 1-methyl-2,6-diaminocyclohexane and an 80–20 weight percent mixture of the 2,4 and 2,6 isomers, as the diamine. The diamine-diacid component was employed in all of Examples IV through VII in an amount of 33 weight percent of the total monomer mixture. In each case, the block of solid polymer obtained was transparent. The melting range of the extracted and dried polymer obtained in each of Examples IV through VII is set forth hereinbelow in Table I:

TABLE I

| Example: | Melting range, ° C. |
|---|---|
| 4 | 137–157 |
| 5 | 128–158 |
| 6 | 130–153 |
| 7 | 136–153 |

The polyamides provided by this invention can be employed in virtually all applications where nylon-6 and caprolactam copolymers are employed, such as the manufacture of film, fibers and molded articles. By reason of their superior transparency, however, they have outstanding utility for the manufacture of thick molded sections for use in lighting fixtures, outdoor advertising signs, and the like, where good light transparency is a requirement of the application.

The above descriptions and particularly the examples are set forth for purposes of illustration only. Many variations and modifications thereof will be apparent to those skilled in the art and can be made without departing from the spirit and scope of the invention herein described.

What is claimed is:

1. A process for preparing a high molecular weight polyamide which is transparent in compression molded specimens 1" thick which comprises polymerizing a monomer mixture consisting essentially of 60 to 80 weight of caprolactam and, correspondingly, 40 to 20 weight percent of an essentially equimolar mixture of a methyldiaminocyclohexane and a dibasic organic acid; said dibasic organic acid being at least one acid selected from the group consisting of alpha, omega-aliphatic dicarboxylic acids and aromatic dibasic acids.

2. A process of claim 10 wherein the monomer mixture consists essentially of from about 65 to about 75 weight percent caprolactam and, correspondingly, about 35 to 25 weight percent of the equimolar mixture of the diamine and the dibasic organic acid.

3. A process of claim 10 wherein the equimolar mixture of the diamine and the dibasic acid constitutes at least 29 weight percent of the monomer mixture.

4. The process of claim 2 wherein the dibasic acid is terephthalic acid.

5. The process of claim 2 wherein the dibasic acid is isophthalic acid.

6. A polyamide prepared by the process of claim 10.

7. A polyamide prepared by the process of claim 2.

8. A polyamide prepared by the process of claim 11.

9. A polyamide prepared by the process of claim 4.

10. A process for preparing a high molecular weight polyamide which is transparent in compression molded specimens 1" thick which comprises polymerizing a monomer mixture consisting essentially of 60 to 80 weight percent of caprolactam and, correspondingly, 40 to 20 weight percent of an essentially equimolar mixture of a methyl-diaminocyclohexane and an alpha, omega-aliphatic dicarboxylic acid containing from 5 to 12 carbon atoms.

11. The process of claim 3 wherein the dibasic organic acid included in the monomer mixture is azelaic acid.

12. The process of claim 1 wherein the methyldiaminocyclohexane is a member of the group consisting of
1-methyl-2,3-diaminocyclohexane,
1-methyl-2,4-diaminocyclohexane,
1-methyl-2,5-diaminocyclohexane,
1-methyl-2,6-diaminocyclohexane,
1-methyl-3,4-diaminocyclohexane and
1-methyl-3,5-diaminocyclohexane.

13. The process of claim 10 wherein the methyldiaminocyclohexane is a member of the group consisting of
1-methyl-2,3-diaminocyclohexane,
1-methyl-2,4-diaminocyclohexane,
1-methyl-2,5-diaminocyclohexane,
1-methyl-2,6-diaminocyclohexane,
1-methyl-3,4-diaminocyclohexane and
1-methyl-3,5-diaminocyclohexane.

References Cited
UNITED STATES PATENTS

| | | | |
|---|---|---|---|
| 2,512,606 | 6/1950 | Bolton et al. | 260—78 R |
| 3,703,595 | 11/1972 | Falkenstein et al. | 260—78 L |

WILLIAM H. SHORT, Primary Examiner

L. M. PHYNES, Assistant Examiner